(12) United States Patent
Spong

(10) Patent No.: US 12,468,396 B2
(45) Date of Patent: Nov. 11, 2025

(54) VIRTUAL MANIPULATION OF AUGMENTED AND VIRTUAL REALITY OBJECTS

(71) Applicant: Snap Inc., Santa Monica, CA (US)

(72) Inventor: Mason Spong, Provo, UT (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/463,113

(22) Filed: Sep. 7, 2023

(65) Prior Publication Data

US 2025/0085783 A1   Mar. 13, 2025

(51) Int. Cl.
| | |
|---|---|
| G06F 3/01 | (2006.01) |
| G06F 3/03 | (2006.01) |
| G06F 3/04815 | (2022.01) |
| G06F 3/04845 | (2022.01) |
| G06F 3/0487 | (2013.01) |
| G06V 10/70 | (2022.01) |
| G06V 40/20 | (2022.01) |

(52) U.S. Cl.
CPC ............ G06F 3/017 (2013.01); G06F 3/0304 (2013.01); G06F 3/04815 (2013.01); G06F 3/04845 (2013.01); G06F 3/0487 (2013.01); G06V 10/70 (2022.01); G06V 40/28 (2022.01)

(58) Field of Classification Search
CPC ...................................................... G06F 3/011
See application file for complete search history.

(56) References Cited

U.S. PATENT DOCUMENTS

| | | | |
|---|---|---|---|
| 7,971,156 B2 | 6/2011 | Albertson et al. | |
| 7,996,793 B2 | 8/2011 | Latta et al. | |
| 8,487,938 B2 | 7/2013 | Latta et al. | |
| 8,856,691 B2 | 10/2014 | Geisner et al. | |
| 9,225,897 B1 | 12/2015 | Sehn et al. | |
| 9,230,160 B1 | 1/2016 | Kanter | |
| 9,276,886 B1 | 3/2016 | Samaranayake | |

(Continued)

FOREIGN PATENT DOCUMENTS

| | | |
|---|---|---|
| CN | 103049761 | 8/2016 |
| EP | 3707693 | 9/2020 |

(Continued)

OTHER PUBLICATIONS

"International Application Serial No. PCT/US2024/045570, International Search Report mailed Dec. 4, 2024", 4 pgs.

(Continued)

*Primary Examiner* — Nan-Ying Yang
(74) *Attorney, Agent, or Firm* — Schwegman Lundberg & Woessner, P.A.

(57) ABSTRACT

Systems and methods are provided. For example, a method includes determining a position of a user's hand and identifying a manipulation gesture performed by the user targeting a virtual object. The method also includes determining a three-dimensional (3D) origin point based on the position of the user's hand when the manipulation gesture is performed, and determining a 3D end point based on a movement of the user's hand from the origin point. The method additionally includes deriving a 3D vector based on the 3D origin point and the 3D end point, and applying an action to the targeted virtual object based on the 3D vector, wherein the targeted virtual object is at a distance greater than the user's arm reach.

20 Claims, 11 Drawing Sheets

(56) References Cited

U.S. PATENT DOCUMENTS

| | | |
|---|---|---|
| 9,705,831 B2 | 7/2017 | Spiegel |
| 9,742,713 B2 | 8/2017 | Spiegel et al. |
| 10,102,423 B2 | 10/2018 | Shaburov et al. |
| 10,284,508 B1 | 5/2019 | Allen et al. |
| 10,439,972 B1 | 10/2019 | Spiegel et al. |
| 10,509,466 B1 | 12/2019 | Miller et al. |
| 10,514,876 B2 | 12/2019 | Sehn |
| 10,579,869 B1 | 3/2020 | Xiong et al. |
| 10,614,855 B2 | 4/2020 | Huang |
| 10,748,347 B1 | 8/2020 | Li et al. |
| 10,958,608 B1 | 3/2021 | Allen et al. |
| 10,962,809 B1 | 3/2021 | Castañeda |
| 10,996,846 B2 | 5/2021 | Robertson et al. |
| 10,997,787 B2 | 5/2021 | Ge et al. |
| 11,012,390 B1 | 5/2021 | Al Majid et al. |
| 11,030,454 B1 | 6/2021 | Xiong et al. |
| 11,036,368 B1 | 6/2021 | Al Majid et al. |
| 11,062,498 B1 | 7/2021 | Voss et al. |
| 11,087,728 B1 | 8/2021 | Canberk et al. |
| 11,092,998 B1 | 8/2021 | Castañeda et al. |
| 11,106,342 B1 | 8/2021 | Al Majid et al. |
| 11,126,206 B2 | 9/2021 | Meisenholder et al. |
| 11,143,867 B2 | 10/2021 | Rodriguez, II |
| 11,169,600 B1 | 11/2021 | Canberk et al. |
| 11,227,626 B1 | 1/2022 | Krishnan Gorumkonda et al. |
| 11,307,747 B2 | 4/2022 | Dancie et al. |
| 11,531,402 B1 | 12/2022 | Stolzenberg |
| 11,546,505 B2 | 1/2023 | Canberk |
| 2009/0012788 A1 | 1/2009 | Gilbert et al. |
| 2009/0228841 A1 | 9/2009 | Hildreth |
| 2011/0301934 A1 | 12/2011 | Tardif |
| 2012/0202569 A1* | 8/2012 | Maizels .................. G06F 3/017 463/2 |
| 2014/0171036 A1 | 6/2014 | Simmons |
| 2015/0120293 A1 | 4/2015 | Wohlert et al. |
| 2015/0169176 A1* | 6/2015 | Cohen .................. G06F 3/017 715/852 |
| 2015/0370320 A1 | 12/2015 | Connor |
| 2017/0123487 A1 | 5/2017 | Hazra et al. |
| 2017/0277684 A1 | 9/2017 | Dharmarajan Mary |
| 2017/0277685 A1 | 9/2017 | Takumi |
| 2017/0351910 A1 | 12/2017 | Elwazer et al. |
| 2018/0046263 A1* | 2/2018 | Shigeta .................. G06F 3/038 |
| 2018/0158370 A1 | 6/2018 | Pryor |
| 2021/0011612 A1 | 1/2021 | Dancie et al. |
| 2021/0074016 A1 | 3/2021 | Li et al. |
| 2021/0090331 A1* | 3/2021 | Ravasz .................. G06T 19/20 |
| 2021/0166732 A1 | 6/2021 | Shaburova et al. |
| 2021/0174034 A1 | 6/2021 | Retek et al. |
| 2021/0241529 A1 | 8/2021 | Cowburn et al. |
| 2021/0303075 A1 | 9/2021 | Cowburn et al. |
| 2021/0303077 A1 | 9/2021 | Anvaripour et al. |
| 2021/0303140 A1 | 9/2021 | Mourkogiannis |
| 2021/0382564 A1 | 12/2021 | Blachly et al. |
| 2021/0397000 A1 | 12/2021 | Rodriguez, II |
| 2021/0405761 A1 | 12/2021 | Canberk |
| 2022/0188539 A1 | 6/2022 | Chan et al. |
| 2022/0206588 A1 | 6/2022 | Canberk et al. |
| 2022/0300730 A1 | 9/2022 | Eirinberg et al. |
| 2022/0300731 A1 | 9/2022 | Eirinberg et al. |
| 2022/0326781 A1 | 10/2022 | Hwang et al. |
| 2022/0334649 A1 | 10/2022 | Hwang et al. |
| 2023/0007085 A1* | 1/2023 | Berliner .................. G06F 3/0482 |
| 2023/0116341 A1 | 4/2023 | Zhang et al. |
| 2023/0195236 A1 | 6/2023 | Sun |
| 2023/0326144 A1* | 10/2023 | Insley .................. G06F 3/04842 345/38 |
| 2024/0061547 A1* | 2/2024 | Fleizach .................. G06F 3/013 |

FOREIGN PATENT DOCUMENTS

| | | |
|---|---|---|
| KR | 20220158824 | 12/2022 |
| WO | 2016168591 | 10/2016 |
| WO | 2019094618 | 5/2019 |
| WO | 2022005687 | 1/2022 |
| WO | 2022005693 | 1/2022 |
| WO | 2022060549 | 3/2022 |
| WO | 2022066578 | 3/2022 |
| WO | 2022132381 | 6/2022 |
| WO | 2022146678 | 7/2022 |
| WO | 2022198182 | 9/2022 |
| WO | 2022216784 | 10/2022 |
| WO | 2022225761 | 10/2022 |
| WO | 2022245765 | 11/2022 |

OTHER PUBLICATIONS

"International Application Serial No. PCT/US2024/045570, Written Opinion mailed Dec. 4, 2024", 8 pgs.

* cited by examiner

VIRTUAL MANIPULATION OF AUGMENTED AND VIRTUAL REALITY OBJECTS

BACKGROUND

Augmented reality (AR) and virtual reality (VR) systems enable the display of certain rendered content, such as three-dimensional (3D) content. VR systems provide for the replacement of a surrounding environment with a virtual environment that includes the 3D content. AR systems provide for the display of the 3D content to overlay, for example, real-time surrounding of the user.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Virtual reality (VR) and/or augmented reality (AR) systems provide for the rendering and display of various virtual objects. VR systems, for example, replace a surrounding environment with a fully virtual environment that includes the virtual objects. AR systems keep portions of the surrounding environment for display and augments the surrounding environment via certain rendered objects, including virtual objects. These AR/VR systems would benefit from interaction techniques to manipulate virtual objects, as traditional input devices like mice and keyboards are not as well suited for AR/VR uses. One approach is to track the user's hands and map them directly to virtual hands, allowing virtual objects to be grabbed and manipulated as if the virtual objects were real objects. However, this technique is more limiting as the virtual objects are constrained to being within arm's reach.

The present innovation discloses "virtual joystick" techniques for manipulating virtual objects without these constraints. In certain examples, a virtual joystick allows users to manipulate virtual objects in AR or VR environments without being limited by arm's reach or requiring a physical controller. To use the virtual joystick the user performs a targeting gesture, such as reaching towards an object to target the object. A manipulation gesture, such as a "pinch" then initiates a "joystick" mode. This manipulation gesture sets a vector starting point in a 3D space. As the user moves their hand after initiating the gesture, a vector is created from the 3D starting point to the current hand position. The vector applies a velocity to the targeted object based on the vector's direction and magnitude. The further the user moves their hand from the starting point, the greater the velocity applied to the object. The application of the velocity can include moving the virtual object.

These techniques enable the user to move virtual objects over unlimited distances and with precision by controlling vectors via hand movements. Other uses of the vectors can include zooming in or out, navigating a space, playing a game, or any other behavior that a physical joystick could perform. The user performs the same or another gesture to stop the virtual joystick control. Accordingly, the virtual joystick provides an intuitive way to manipulate virtual objects without physical constraints by translating hand movements, for example, into vectors.

Networked Computing Environment

Figure 1:
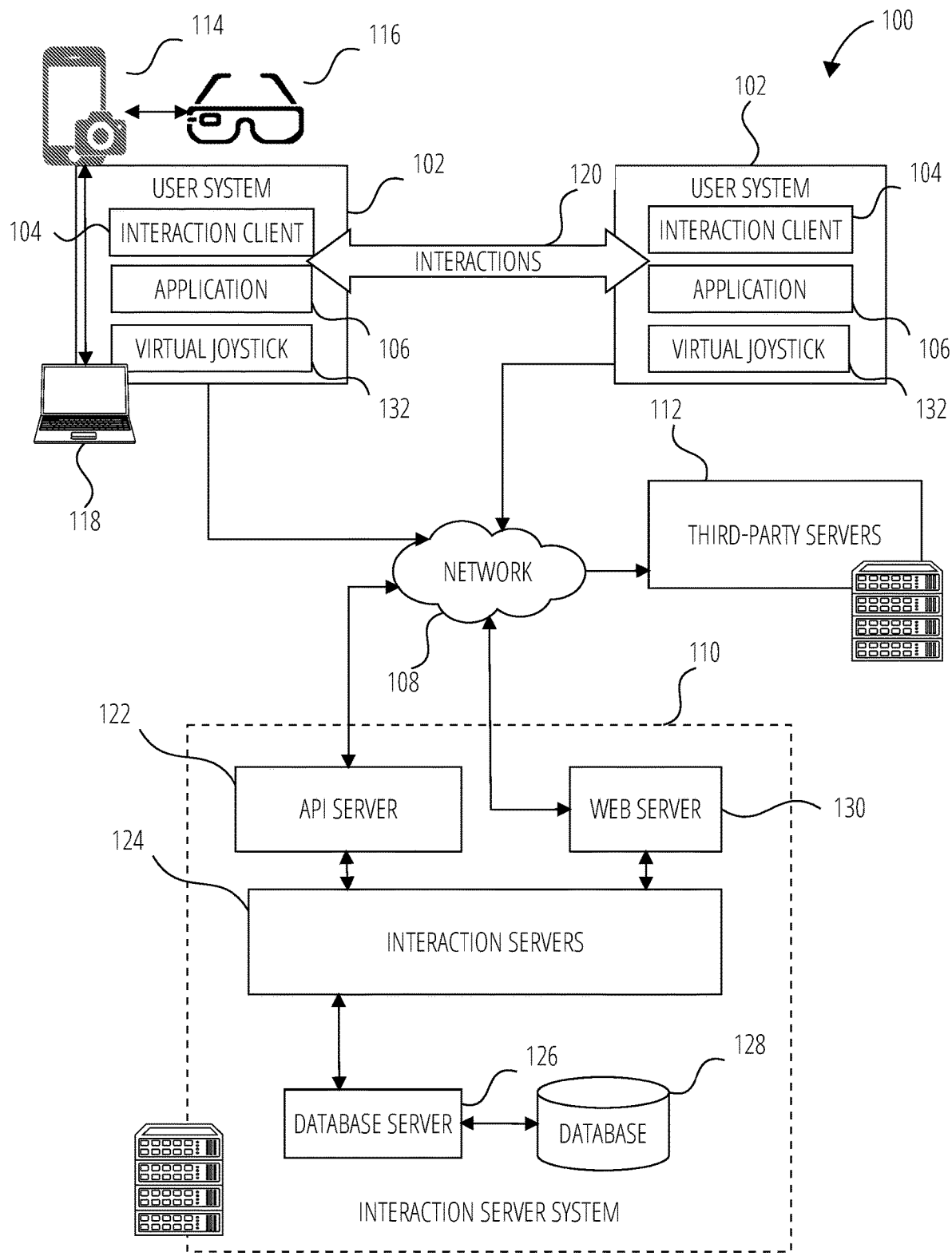
FIG. 1 is a diagrammatic representation of a networked environment in which the present disclosure may be deployed, according to some examples.

FIG. 1 is a block diagram showing an example interaction system 100 for facilitating interactions (e.g., exchanging text messages, conducting text audio and video calls, or playing games) over a network. The interaction system 100 includes multiple user systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can also communicate with locally hosted applications 106 using Applications Program Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, entity relationship information, and live event information. Data exchanges within the interaction system 100 are invoked and controlled through functions available via user interfaces (UIs) of the interaction clients 104.

Turning now specifically to the interaction server system 110, an Application Program Interface (API) server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The Application Program Interface (API) server 122 receives and transmits interaction data (e.g., commands and message payloads) between the interaction servers 124 and the user systems 102 (and, for example, interaction clients 104 and other application 106) and the third-party server 112. Specifically, the Application Program Interface (API) server 122 provides a set of interfaces (e.g., routines and protocols) that can be called or queried by the interaction client 104 and other applications 106 to invoke functionality of the interaction servers 124. The Application Program Interface (API) server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity relationship graph (e.g., the entity graph 410); the location of friends within an entity relationship graph; and opening an application event (e.g., relating to the interaction client 104).

A virtual joystick system 132 is also provided. The virtual joystick system may use sensors, such as camera sensors, to observe a user's hand during operations of the user system 102. The virtual joystick system 132 then creates a virtual joystick, for example, when the user system 102 is used as an AR or VR system. In certain examples, the virtual joystick allows users to manipulate virtual objects in AR or VR environments without being limited by user's reach (e.g., arm's reach) or by requiring a physical controller, as further described below with respect to FIG. 2.

Figure 2:
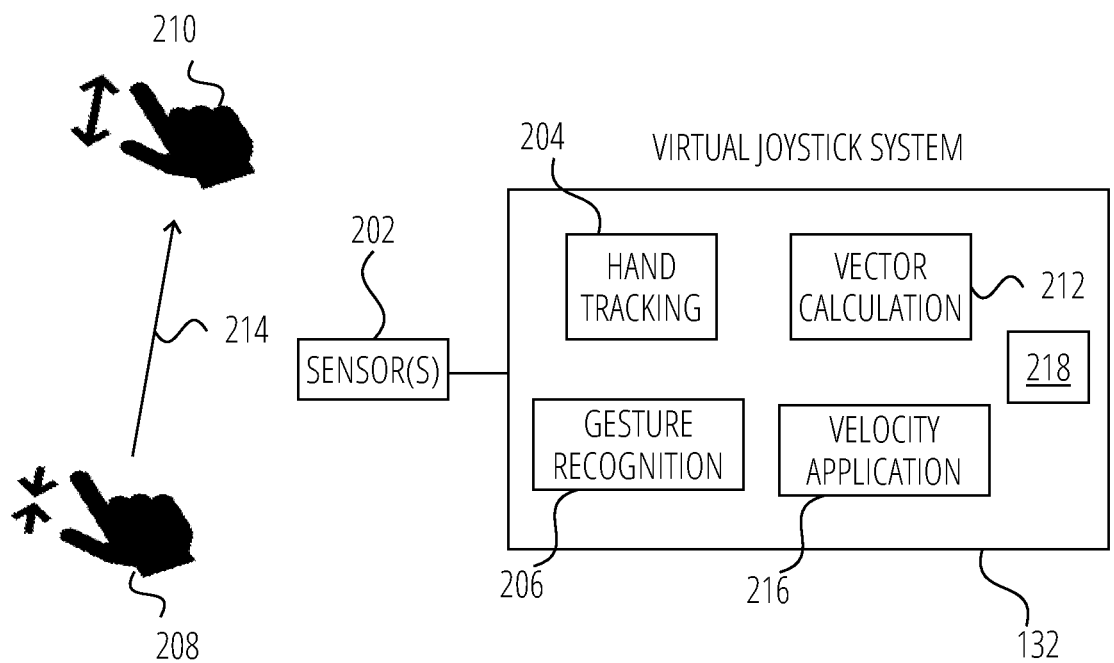
FIG. 2 is a block diagram of an example of virtual joystick system, according to some examples.

FIG. 2 is a block diagram of an example of the virtual joystick system 132, according to some examples. The virtual joystick system 132 is used to create a virtual joystick based on a user's hand and certain gestures. For example, the virtual joystick system 132 is coupled to one or more sensors 202, such as a camera (e.g., visible light camera, depth camera, infrared camera), a radar sensor, a light detection and ranging (lidar) sensor, and the like. In the depicted embodiment, a hand tracking system 204 is used to observe, via the sensors 202, the user's hands and hand position in a 3D space. The hand tracking system 204 can preprocess signals from the sensors 202 to reduce image noise, such as by applying filters (e.g., Gaussian blur filters), and then perform a background subtraction to focus only on the hands, and/or a depth threshold when depth cameras can be used.

The hand tracking system 204 also provides for finger and hand landmark detection, where techniques like convex hull and convexity defects can be used in detecting fingertips and valleys. Deep learning models such as OpenPose can also be used detect hand landmarks directly from and RGB image. A gesture recognition system 206 then is used to determine if the user is initiating certain gestures. For example, the gesture recognition system 206 can detect a manipulation gesture, such as a pinch gesture 208. The pinch gesture 208 is detected when the user closes two fingers together, such as the index finger and the thumb.

Certain gestures, such as the pinch gesture 208, correspond to a vector start gesture. The user can then move the hand in a desired direction and then stop the hand or disengage the pinch gesture 208 by opening the fingers at position 210. A vector calculation system 212 is then used to derive a vector 214 between a position of the initial pinch gesture 208 and position 210. The vector 214 includes an origin point (Start x, Start y, Start z) in 3D space (e.g., location of the pinch gesture 208), an end point (End x, End y, End z) in 3D space (e.g., position 210), and, in some embodiments, a magnitude (e.g., velocity). In some examples, the magnitude corresponds to a distance between the origin point and the end point. In other examples, the magnitude corresponds to a speed in centimeters per second (cm/sec) of the user's hand moving from the origin point to the end point. A velocity application system 216 then applies the vector 214, for example, to manipulate a 3D object, for use in a gaming system, for use in a computer aided design (CAD) system, and so on. In some examples, the velocity application system 216 provides one or more software drivers 218 that provide the equivalent or otherwise emulate physical joystick drivers via the application of one or more vectors, such as the vector 214.

In some examples, the length of the vector 214 is converted into a velocity. For example, every 1 cm in length of the vector 214 can be translated into a movement having a 10 cm/sec speed. It is to be noted that any scaling can be used, e.g., 1 cm to 1 cm/sec, 1 cm to ⅒ cm/sec, and so on. Accordingly, the user can pinch a virtual object, move their hand 1 cm, and the virtual object will then be moved in the direction of the vector 214 at the desired mapped speed. In other examples, the captured vector velocity (e.g., speed of the user's hand) is used in lieu of the vector's distance to provide the desired move speed.

It is also to be noted that, in some examples, multiple vectors can be used once a virtual joystick mode is entered. For example, the user may enter the virtual joystick mode via the pinch gesture 208 and then move their hand position 210 to create vector 214. The user can then stop at position 210 and move their hand again in any desired direction and stop again to create another vector, and so on. Disengaging from the virtual joystick mode can then occur when the user opens their fingers or via other gestures.

System Architecture

Figure 3:
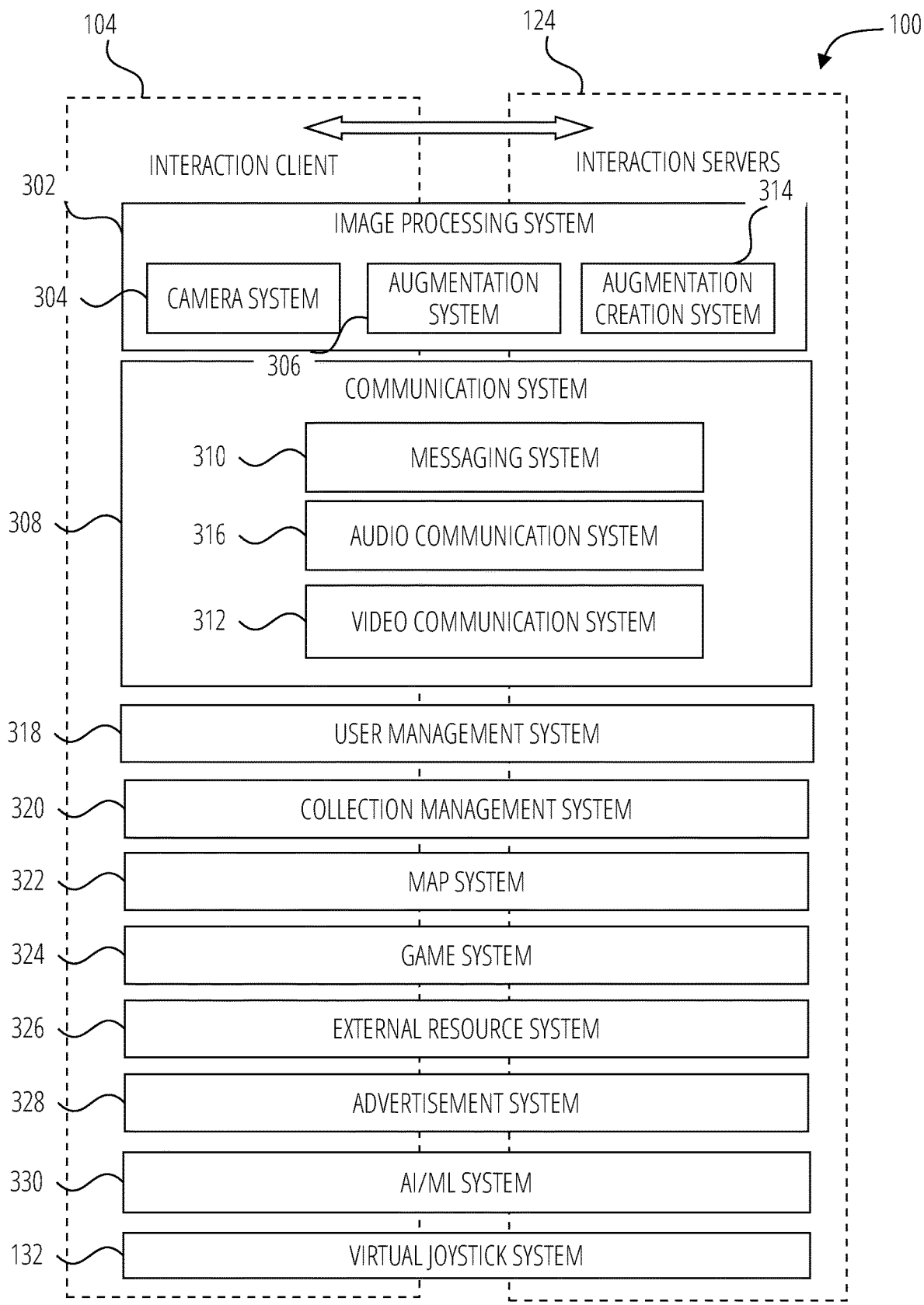
FIG. 3 is a diagrammatic representation of a messaging system that has both client-side and server-side functionality, according to some examples.

FIG. 3 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. In some examples, these subsystems are implemented as microservices. A microservice subsystem (e.g., a microservice application) may have components that enable it to operate independently and communicate with other services. Example components of microservice subsystem may include:

Function logic: The function logic implements the functionality of the microservice subsystem, representing a specific capability or function that the microservice provides.

API interface: Microservices may communicate with each other components through well-defined APIs or interfaces, using lightweight protocols such as REST or messaging. The API interface defines the inputs and outputs of the microservice subsystem and how it interacts with other microservice subsystems of the interaction system 100.

Data storage: A microservice subsystem may be responsible for its own data storage, which may be in the form of a database, cache, or other storage mechanism (e.g., using the database server 126 and database 128). This enables a microservice subsystem to operate independently of other microservices of the interaction system 100.

Service discovery: Microservice subsystems may find and communicate with other microservice subsystems of the interaction system 100. Service discovery mechanisms enable microservice subsystems to locate and communicate with other microservice subsystems in a scalable and efficient way.

Monitoring and logging: Microservice subsystems may need to be monitored and logged in order to ensure availability and performance. Monitoring and logging mechanisms enable the tracking of health and performance of a microservice subsystem.

In some examples, the interaction system 100 may employ a monolithic architecture, a service-oriented architecture (SOA), a function-as-a-service (FaaS) architecture, or a modular architecture:

Example subsystems are discussed below.

An image processing system 302 provides various functions that enable a user to capture and augment (e.g., annotate or otherwise modify or edit) media content associated with a message.

A camera system 304 includes control software (e.g., in a camera application) that interacts with and controls hardware camera hardware (e.g., directly or via operating system controls) of the user system 102 to modify and augment real-time images captured and displayed via the interaction client 104.

The augmentation system 306 provides functions related to the generation and publishing of augmentations (e.g., media overlays) for images captured in real-time by cameras of the user system 102 or retrieved from memory of the user system 102. For example, the augmentation system 306 operatively selects, presents, and displays media overlays (e.g., an image filter or an image lens) to the interaction client 104 for the augmentation of real-time images received via the camera system 304 or stored images retrieved from memory 602 of a user system 102. These augmentations are selected by the augmentation system 306 and presented to a user of an interaction client 104, based on a number of inputs and data, such as for example:

Geolocation of the user system 102; and
Entity relationship information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 302 may interact with, and support, the various subsystems of the communication system 308, such as the messaging system 310 and the video communication system 312.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 302 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 302 provides a user-based publication platform that enables users to select a geolocation on a map and upload content associated with the selected geolocation. The user may also specify circumstances under which a particular media overlay should be offered to other users. The image processing system 302 generates a media overlay that includes the uploaded content and associates the uploaded content with the selected geolocation.

The augmentation creation system 314 supports augmented reality developer platforms and includes an application for content creators (e.g., artists and developers) to create and publish augmentations (e.g., augmented reality experiences) of the interaction client 104. The augmentation creation system 314 provides a library of built-in features and tools to content creators including, for example custom shaders, tracking technology, and templates.

In some examples, the augmentation creation system 314 provides a merchant-based publication platform that enables merchants to select a particular augmentation associated with a geolocation via a bidding process. For example, the augmentation creation system 314 associates a media overlay of the highest bidding merchant with a corresponding geolocation for a predefined amount of time.

A communication system 308 is responsible for enabling and processing multiple forms of communication and interaction within the interaction system 100 and includes a messaging system 310, an audio communication system 316, and a video communication system 312. The messaging system 310 is responsible for enforcing the temporary or time-limited access to content by the interaction clients 104. The messaging system 310 incorporates multiple timers (e.g., within an ephemeral timer system) that, based on duration and display parameters associated with a message or collection of messages (e.g., a story), selectively enable access (e.g., for presentation and display) to messages and associated content via the interaction client 104. The audio communication system 316 enables and supports audio communications (e.g., real-time audio chat) between multiple interaction clients 104. Similarly, the video communication system 312 enables and supports video communications (e.g., real-time video chat) between multiple interaction clients 104.

A user management system 318 is operationally responsible for the management of user data and profiles, and maintains entity information (e.g., stored in entity tables 408, entity graphs 410 and profile data 402) regarding users and relationships between users of the interaction system 100.

A collection management system 320 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 320 may also be responsible for publishing an icon that provides notification of a particular collection to the user interface of the interaction client 104. The collection management system 320 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 320 employs machine vision (or image recognition technology) and content rules to curate a content collection automatically. In certain examples, compensation may be paid to a user to include user-generated content into a collection. In such cases, the collection management system 320 operates to automatically make payments to such users to use their content.

A map system 322 provides various geographic location (e.g., geolocation) functions and supports the presentation of map-based media content and messages by the interaction client 104. For example, the map system 322 enables the display of user icons or avatars (e.g., stored in profile data 402) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 324 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 326 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes Application Programming Interfaces (APIs) with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A bridge script running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a GUI of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an O Auth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 328 operationally enables the purchasing of advertisements by third parties for presentation to end-users via the interaction clients 104 and also handles the delivery and presentation of these advertisements.

An artificial intelligence and machine learning system 330 provides a variety of services to different subsystems within the interaction system 100. For example, the artificial intelligence and machine learning system 330 operates with the image processing system 302 and the camera system 304 to analyze images and extract information such as objects, text, or faces. This information can then be used by the image processing system 302 to enhance, filter, or manipulate images. The artificial intelligence and machine learning system 330 may be used by the augmentation system 306 to generate augmented content and augmented reality experiences, such as adding virtual objects or animations to real-world images. The communication system 308 and messaging system 310 may use the artificial intelligence and machine learning system 330 to analyze communication patterns and provide insights into how users interact with each other and provide intelligent message classification and tagging, such as categorizing messages based on sentiment or topic. The artificial intelligence and machine learning system 330 may also provide chatbot functionality to message interactions 120 between user systems 102 and between a user system 102 and the interaction server system 110. The artificial intelligence and machine learning system 330 may also work with the audio communication system 316 to provide speech recognition and natural language processing capabilities, allowing users to interact with the interaction system 100 using voice commands.

The virtual joystick system 132 is also shown. As mentioned earlier, the virtual joystick system 132 observes the user's hands via sensors included in the interaction client 104 (e.g., camera system 304) and provides for a vector-based joystick. In some examples, the virtual joystick created via the virtual joystick system 132 enables collaborative interactions, such as by sharing 3D objects created by various users. The interaction servers 124, for example, can be used for collaboration by providing multiple interaction clients 104 with shared objects that can then be manipulated via respective virtual joysticks manipulated at each of the interaction clients 104. Accordingly, the virtual joystick system 132 provides for certain inputs, such as joystick outputs, to the interaction servers 124 so that the various systems shown in FIG. 3 (e.g., systems 302, 308, 318, 320, 322, 324, 326, 328, 330). By using a vector-based virtual joystick, the techniques describe herein provide for improved object-manipulation inputs that are not restricted to the length of the user's arm.

Data Architecture

Figure 4:
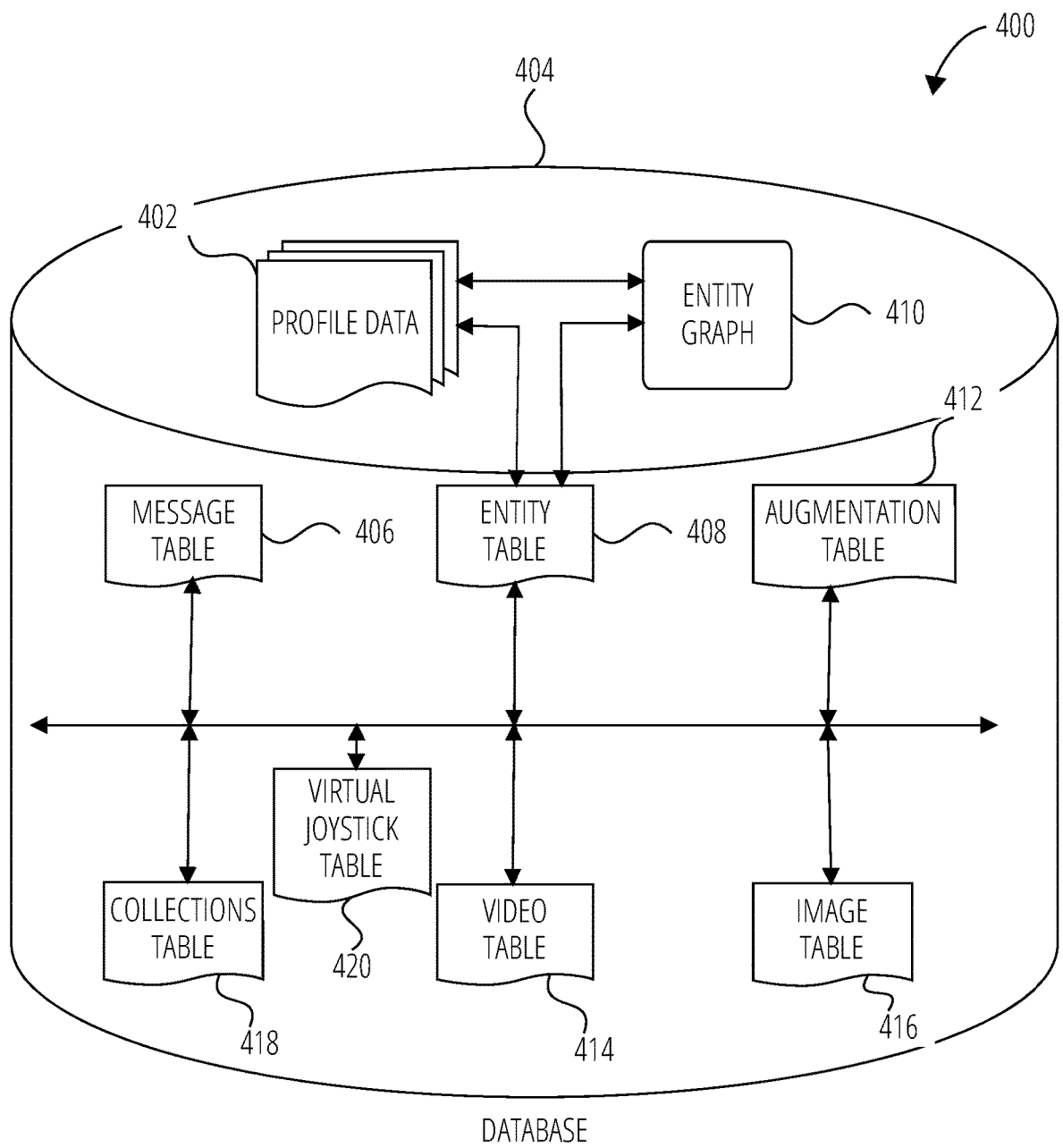
FIG. 4 is a diagrammatic representation of a data structure as maintained in a database, according to some examples.

FIG. 4 is a schematic diagram illustrating data structures 400, which may be stored in the database 404 of the interaction server system 110, according to certain examples. While the content of the database 404 is shown to comprise multiple tables, it will be appreciated that the data could be stored in other types of data structures (e.g., as an object-oriented database).

The database 404 includes message data stored within a message table 406. This message data includes, for any particular message, at least message sender data, message recipient (or receiver) data, and a payload. Further details regarding information that may be included in a message, and included within the message data stored in the message table 406, are described below with reference to FIG. 4.

An entity table 408 stores entity data, and is linked (e.g., referentially) to an entity graph 410 and profile data 402. Entities for which records are maintained within the entity table 408 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 410 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 408. Such privacy settings may be applied to all types of relationships within the context of the interaction system 100, or may selectively be applied to certain types of relationships.

The profile data 402 stores multiple types of profile data about a particular entity. The profile data 402 may be selectively used and presented to other users of the interaction system 100 based on privacy settings specified by a particular entity. Where the entity is an individual, the profile data 402 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 402 for the group may similarly include one or more avatar representations associated with the group, in addition to the group name, members, and various settings (e.g., notifications) for the relevant group.

The database 404 also stores augmentation data, such as overlays or filters, in an augmentation table 412. The augmentation data is associated with and applied to videos (for which data is stored in a video table 414) and images (for which data is stored in an image table 416).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 416 includes augmented reality content items (e.g., corresponding to applying "lenses" or augmented reality experiences). An augmented reality content item may be a real-time special effect and sound that may be added to an image or a video.

A collections table 418 stores data regarding collections of messages and associated image, video, or audio data, which are compiled into a collection (e.g., a story or a gallery). The creation of a particular collection may be initiated by a particular user (e.g., each user for which a record is maintained in the entity table 408). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 414 stores video data that, in some examples, is associated with messages for which records are maintained within the message table 406. Similarly, the image table 416 stores image data associated with messages for which message data is stored in the entity table 408. The entity table 408 may associate various augmentations from the augmentation table 412 with various images and videos stored in the image table 416 and the video table 414.

The databases 404 also include a virtual joystick table 420. The virtual joystick table 420 stores data for the creation and use of virtual joysticks via the virtual joystick system 132. For example, data used to provide software drivers for external systems to interface with virtual joysticks can be stored in the virtual joystick table 420. Likewise, data used to calculate vector origin point, end point, and/or vector velocity can be stored in the virtual joystick table 420. Models, such as AI models used to detect hand position and/or gestures can also be stored in the virtual joystick table 420.

Data Communications Architecture

Figure 5:
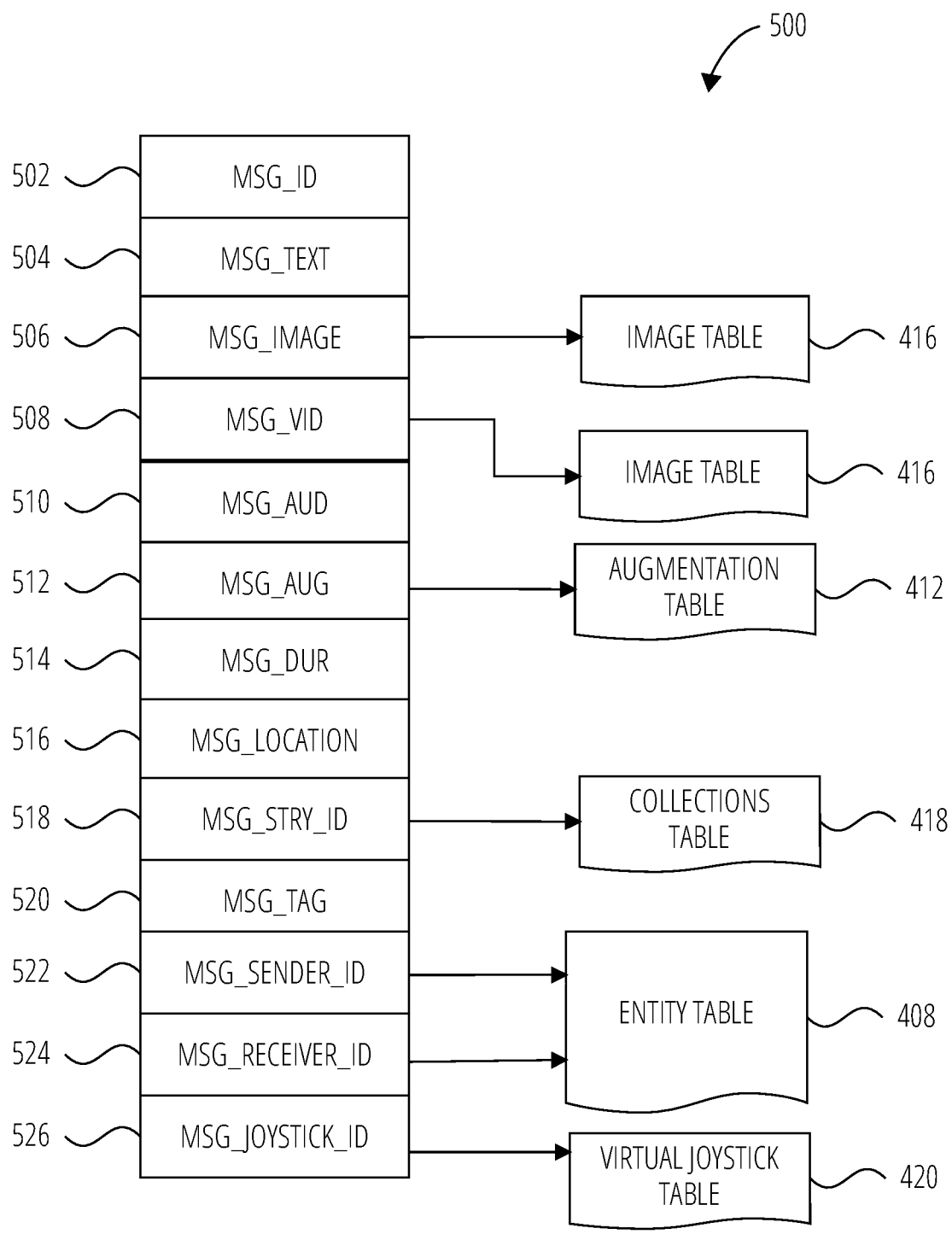
FIG. 5 is a diagrammatic representation of a message, according to some examples.

FIG. 5 is a schematic diagram illustrating a structure of a message 500, according to some examples, generated by an interaction client 104 for communication to a further interaction client 104 via the interaction servers 124. The content of a particular message 500 is used to populate the message table 406 stored within the database 404, accessible by the interaction servers 124. Similarly, the content of a message 500 is stored in memory as "in-transit" or "in-flight" data of the user system 102 or the interaction servers 124. A message 500 is shown to include the following example components:

Message identifier 502: a unique identifier that identifies the message 500.

Message text payload 504: text, to be generated by a user via a user interface of the user system 102, and that is included in the message 500.

Message image payload 506: image data, captured by a camera component of a user system 102 or retrieved from a memory component of a user system 102, and that is included in the message 500. Image data for a sent or received message 500 may be stored in the image table 416.

Message video payload 508: video data, captured by a camera component or retrieved from a memory component of the user system 102, and that is included in the message 500. Video data for a sent or received message 500 may be stored in the image table 416.

Message audio payload 510: audio data, captured by a microphone or retrieved from a memory component of the user system 102, and that is included in the message 500.

Message augmentation data 512: augmentation data (e.g., filters, stickers, or other annotations or enhancements) that represents augmentations to be applied to message image payload 506, message video payload 508, or message audio payload 510 of the message 500. Augmentation data for a sent or received message 500 may be stored in the augmentation table 412.

Message duration parameter 514: parameter value indicating, in seconds, the amount of time for which content of the message (e.g., the message image payload 506, message video payload 508, message audio payload 510) is to be presented or made accessible to a user via the interaction client 104.

Message geolocation parameter 516: geolocation data (e.g., latitudinal and longitudinal coordinates) associated with the content payload of the message. Multiple message geolocation parameter 516 values may be included in the payload, each of these parameter values being associated with respect to content items included in the content (e.g., a specific image within the message image payload 506, or a specific video in the message video payload 508).

Message story identifier 518: identifier values identifying one or more content collections (e.g., "stories" identified in the collections table 418) with which a particular content item in the message image payload 506 of the message 500 is associated. For example, multiple images within the message image payload 506 may each be associated with multiple content collections using identifier values.

Message tag 520: each message 500 may be tagged with multiple tags, each of which is indicative of the subject matter of content included in the message payload. For example, where a particular image included in the message image payload 506 depicts an animal (e.g., a lion), a tag value may be included within the message tag 520 that is indicative of the relevant animal. Tag values may be generated manually, based on user input, or may be automatically generated using, for example, image recognition.

Message sender identifier 522: an identifier (e.g., a messaging system identifier, email address, or device identifier) indicative of a user of the user system 102 on which the message 500 was generated and from which the message 500 was sent.

Message receiver identifier 524: an identifier (e.g., a messaging system identifier, email address, or device identifier) indicative of a user of the user system 102 to which the message 500 is addressed.

Message virtual joystick identifier 526: an identifier indicative of data for a virtual joystick stored in the virtual joystick table 420 to which the message 500 can point to or otherwise retrieve.

The contents (e.g., values) of the various components of message 500 may be pointers to locations in tables within which content data values are stored. For example, an image value in the message image payload 506 may be a pointer to (or address of) a location within an image table 416. Similarly, values within the message video payload 508 may point to data stored within an image table 416, values stored within the message augmentation data 512 may point to data stored in an augmentation table 412, values stored within the message story identifier 518 may point to data stored in a collections table 418, and values stored within the message sender identifier 522 and the message receiver identifier 524 may point to user records stored within an entity table 408. Similarly, the message virtual joystick identifier 526 may point to montage records stored within the virtual joystick table 420.

System with Head-Wearable Apparatus

Figure 6:
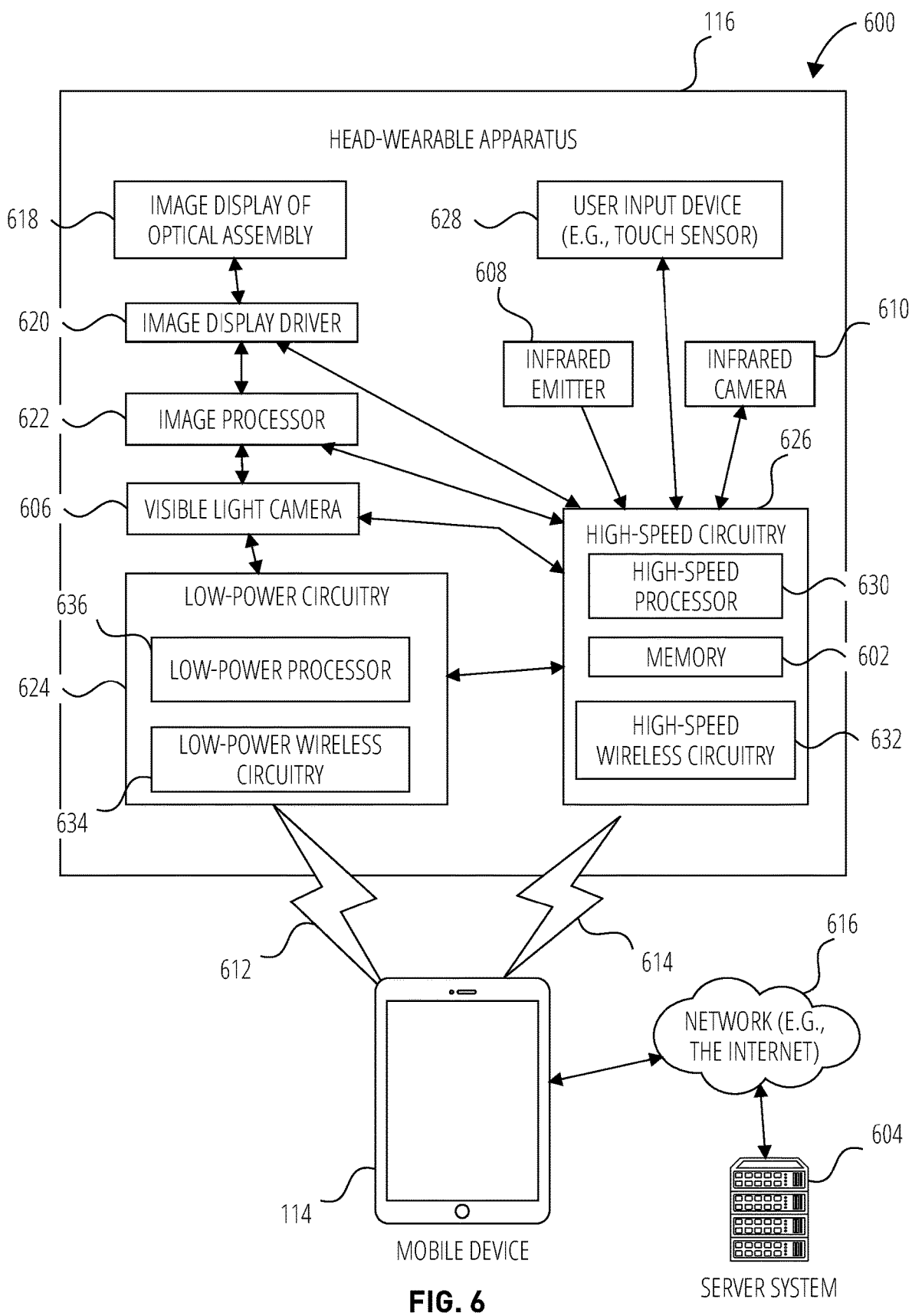
FIG. 6 illustrates a system including a head-wearable apparatus, according to some examples.

FIG. 6 illustrates a system 600 including a head-wearable apparatus 116 with a selector input device, according to some examples. FIG. 6 is a high-level functional block diagram of an example head-wearable apparatus 116 communicatively coupled to a mobile device 114 and various server systems 604 (e.g., the interaction server system 110) via various networks 108. In some examples, the head-wearable apparatus 116 is an AR and/or a VR device suitable for manipulating virtual objects via the virtual joystick system 132.

The head-wearable apparatus 116 includes one or more cameras, each of which may be, for example, a visible light camera 606, an infrared emitter 608, and an infrared camera 610. The visible light camera 606, the infrared emitter 608, and/or the infrared camera 610 can be used as sensor to provide inputs into the virtual joystick system 132. The virtual joystick system 132 can then observe, for example, hand movements used to derive one or more vectors. The vectors can then be used to manipulate objects and as provided to the mobile device 114 and/or server system 604.

The mobile device 114 connects with head-wearable apparatus 116 using both a low-power wireless connection 612 and a high-speed wireless connection 614. The mobile device 114 is also connected to the server system 604 and the network 616.

The head-wearable apparatus 116 further includes two image displays of the image display of optical assembly 618. The two image displays of optical assembly 618 include one associated with the left lateral side and one associated with the right lateral side of the head-wearable apparatus 116. The head-wearable apparatus 116 also includes an image display driver 620, an image processor 622, low-power circuitry 624, and high-speed circuitry 626. The image display of optical assembly 618 is for presenting images and videos, including an image that can include a graphical user interface to a user of the head-wearable apparatus 116.

The image display driver 620 commands and controls the image display of optical assembly 618. The image display driver 620 may deliver image data directly to the image display of optical assembly 618 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device 628 (e.g., touch sensor or push button), including an input surface on the head-wearable apparatus 116. The user input device 628 (e.g., touch sensor or push button) is to receive from the user an input selection to manipulate the graphical user interface of the presented image.

The components shown in FIG. 6 for the head-wearable apparatus 116 are located on one or more circuit boards, for example a PCB or flexible PCB, in the rims or temples. Alternatively, or additionally, the depicted components can be located in the chunks, frames, hinges, or bridge of the head-wearable apparatus 116. Left and right visible light cameras 606 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 116 includes a memory 602, which stores instructions to perform a subset or all of the functions described herein. The memory 602 can also include storage device.

As shown in FIG. 6, the high-speed circuitry 626 includes a high-speed processor 630, a memory 602, and high-speed wireless circuitry 632. In some examples, the image display driver 620 is coupled to the high-speed circuitry 626 and operated by the high-speed processor 630 in order to drive the left and right image displays of the image display of optical assembly 618. The high-speed processor 630 may be any processor capable of managing high-speed communications and operation of any general computing system needed for the head-wearable apparatus 116. The high-speed processor 630 includes processing resources needed for managing high-speed data transfers on a high-speed wireless connection 614 to a wireless local area network (WLAN) using the high-speed wireless circuitry 632. In certain examples, the high-speed processor 630 executes an operating system such as a LINUX operating system or other such operating system of the head-wearable apparatus 116, and the operating system is stored in the memory 602 for execution. In addition to any other responsibilities, the high-speed processor 630 executing a software architecture for the head-wearable apparatus 116 is used to manage data transfers with high-speed wireless circuitry 632. In certain examples, the high-speed wireless circuitry 632 is configured to implement Institute of Electrical and Electronic Engineers (IEEE) 802.11 communication standards, also referred to herein as WI-FI®. In some examples, other high-speed communications standards may be implemented by the high-speed wireless circuitry 632.

The low-power wireless circuitry 634 and the high-speed wireless circuitry 632 of the head-wearable apparatus 116 can include short-range transceivers (Bluetooth™) and wireless wide, local, or wide area network transceivers (e.g., cellular or WI-FI®). Mobile device 114, including the transceivers communicating via the low-power wireless connection 612 and the high-speed wireless connection 614, may be implemented using details of the architecture of the head-wearable apparatus 116, as can other elements of the network 616.

The memory 602 includes any storage device capable of storing various data and applications, including, among other things, camera data generated by the left and right visible light cameras 606, the infrared camera 610, and the image processor 622, as well as images generated for display by the image display driver 620 on the image displays of the image display of optical assembly 618. While the memory 602 is shown as integrated with high-speed circuitry 626, in some examples, the memory 602 may be an independent standalone element of the head-wearable apparatus 116. In certain such examples, electrical routing lines may provide a connection through a chip that includes the high-speed processor 630 from the image processor 622 or the low-power processor 636 to the memory 602. In some examples, the high-speed processor 630 may manage addressing of the memory 602 such that the low-power processor 636 will boot the high-speed processor 630 any time that a read or write operation involving memory 602 is needed.

As shown in FIG. 6, the low-power processor 636 or high-speed processor 630 of the head-wearable apparatus 116 can be coupled to the camera (visible light camera 606, infrared emitter 608, or infrared camera 610), the image display driver 620, the user input device 628 (e.g., touch sensor or push button), and the memory 602.

The head-wearable apparatus 116 is connected to a host computer. For example, the head-wearable apparatus 116 is paired with the mobile device 114 via the high-speed wireless connection 614 or connected to the server system 604 via the network 616. The server system 604 may be one or more computing devices as part of a service or network computing system, for example, that includes a processor, a memory, and network communication interface to communicate over the network 616 with the mobile device 114 and the head-wearable apparatus 116.

The mobile device 114 includes a processor and a network communication interface coupled to the processor. The network communication interface allows for communication over the network 616, low-power wireless connection 612, or high-speed wireless connection 614. Mobile device 114 can further store at least portions of the instructions in the memory of the mobile device 114 memory to implement the functionality described herein.

Output components of the head-wearable apparatus 116 include visual components, such as a display such as a liquid crystal display (LCD), a plasma display panel (PDP), a light-emitting diode (LED) display, a projector, or a waveguide. The image displays of the optical assembly are driven by the image display driver 620. The output components of the head-wearable apparatus 116 further include acoustic components (e.g., speakers), haptic components (e.g., a vibratory motor), other signal generators, and so forth. The input components of the head-wearable apparatus 116, the mobile device 114, and server system 604, such as the user input device 628, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include biometric sensors, additional sensors, or display elements integrated with the head-wearable apparatus 116. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The biometric components may include a brain-machine interface (BMI) system that allows communication between the brain and an external device or machine. This may be achieved by recording brain activity data, translating this data into a format that can be understood by a computer, and then using the resulting signals to control the device or machine.

Example types of BMI technologies, including:

Electroencephalography (EEG) based BMIs, which record electrical activity in the brain using electrodes placed on the scalp.

Invasive BMIs, which used electrodes that are surgically implanted into the brain.

Optogenetics BMIs, which use light to control the activity of specific nerve cells in the brain.

Any biometric data collected by the biometric components is captured and stored with only user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the biometric data is not shared or sold to any third party without the explicit consent of the user. In addition, appropriate technical and organizational measures are implemented to ensure the security and confidentiality of this sensitive information.

The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 612 and high-speed wireless connection 614 from the mobile device 114 via the low-power wireless circuitry 634 or high-speed wireless circuitry 632.

Figure 7:
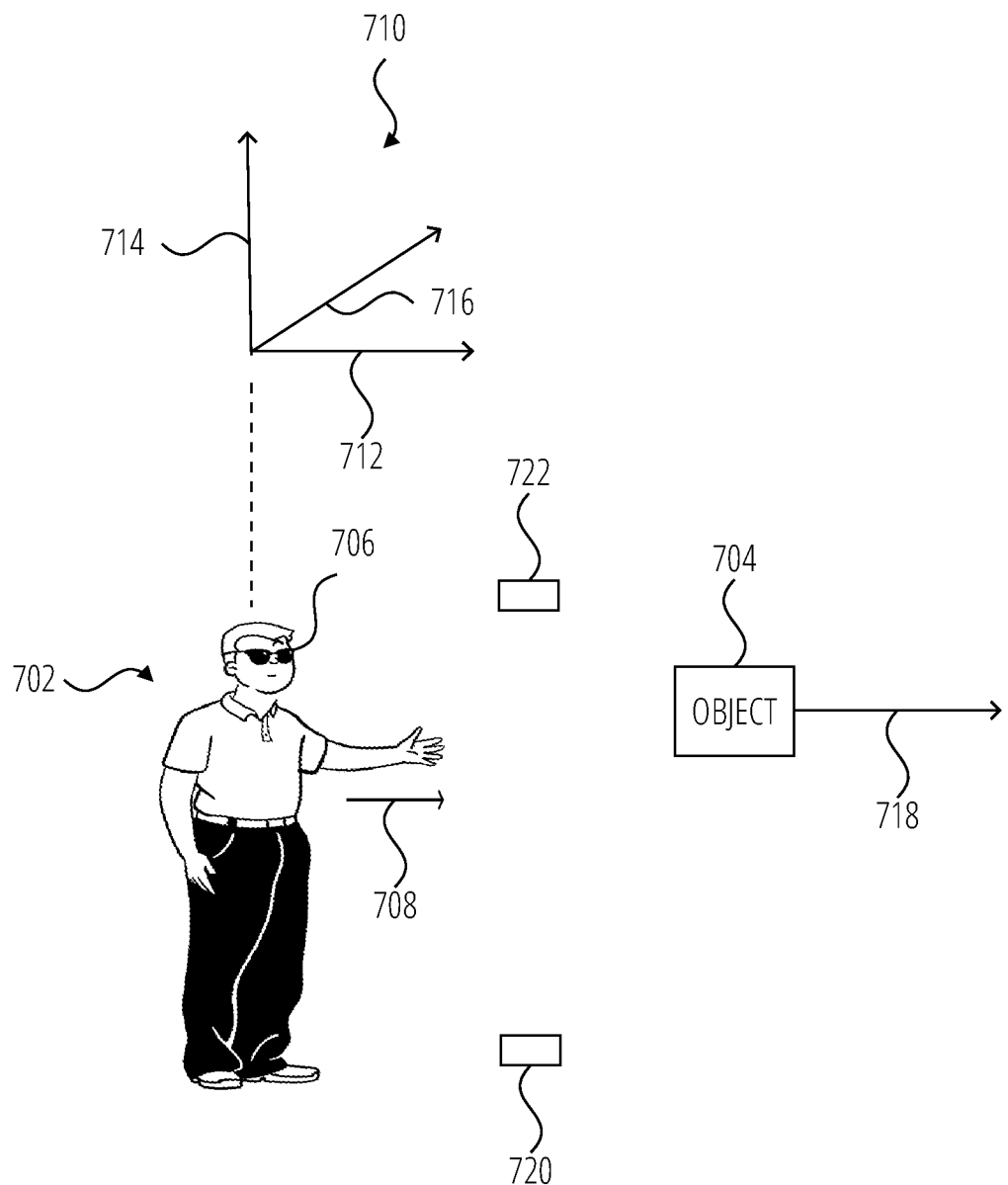
FIG. 7 illustrates a user manipulating a virtual object, according to some examples.

FIG. 7 illustrates a user 702 manipulating an object 704 that is beyond the user's reach, according to some examples. In the depicted example, the user 702 is wearing an AR/VR device 706. For example, the AR/VR device 706 worn by the user can be implemented via the head-wearable apparatus 116. Accordingly, the AR/VR device 706 includes various sensors, such as the sensors 202 (e.g., cameras, radar, lidar) suitable for observing the user's hands. In some examples, the virtual joystick system 132, can also be included in the AR/VR device 706.

As illustrated, the object 704 is a virtual object that is too far for the user to reach and manipulate without walking over to the object 704. Accordingly, the user can first target the object 704 via a targeting gesture (e.g., extending a hand to the object) and then and apply a manipulation gesture, such as a pinch gesture, "pinching" the object 704 between a thumb and an index finger. To move the object 704, the user will then create a vector 708 by moving their pinched hand in a desired move direction and then stop. As mentioned above, the initial pinch position corresponds to a vector origin point (Start x, Start y, Start z) in a 3D space, and the location where the user stops moving their hand corresponds to a vector end point (End x, End y, End z) in the 3D space.

In one example, the 3D space is defined via 3D axes 710 having an x-axis 712, a y-axis 714, and a z-axis 716, where an origin point of the 3D axes 710 where the axes 712, 714, and 716 intersect is positioned relative to the user 702, such as at the user's body midpoint or chest. Accordingly, the vector 708 origin point (Start x, Start y, Start z) and end point (End x, End y, End z) can be derived based on the 3d axes 710. The vector 708 is then translated into a vector 718. The vector 718 has the same direction as the vector 708 and is assigned, in one example, a vector velocity based on the length of the vector 708. Scaling can be used to assign the vector 718 velocity. For example, a vector 708 length of 1 cm can be scaled up or down via a scalar factor to result in a vector 718 velocity=1 cm×scalar factor. The vector 718 can then be used, for example, to move the object 704 in the vector's 718 direction at the vector's 718 velocity. That is, the object 718 is imparted a velocity in a direction pointed to by the vector 718. Indeed, the object can then move ad infinitum at the desired direction and imparted velocity until the user 702 issues the disengage virtual joystick command, for example, by opening the fingers that were previously pinched together.

It is to be understood that the gestures used to initiate the virtual joystick via origin point of the vector 708 can include other hand gestures such as extending an index finger (e.g, pointing gesture) as well as non-hand gestures such as a foot tap and/or a voice command. The virtual joystick system 132 will then observe the hand's middle point in the palm or extended index finger as the hand moves, and another hand gesture (e.g, making a fist), foot tap, and/or voice command will then be used to define the vector's end point. It is also to be noted that, in some examples, sensors for observing the hand include sensors disposed external to the AR/VR device 706, such as the depicted sensors 720, 722. The sensors 720, 722 can incorporate camera sensors, radar, lidar, and so on, useful for observing the user 702 and the user's hands. Indeed, by observing the user's hand and performing vector transformations, the object 704 can be manipulated even when outside of the user's grasp.

Figure 8:
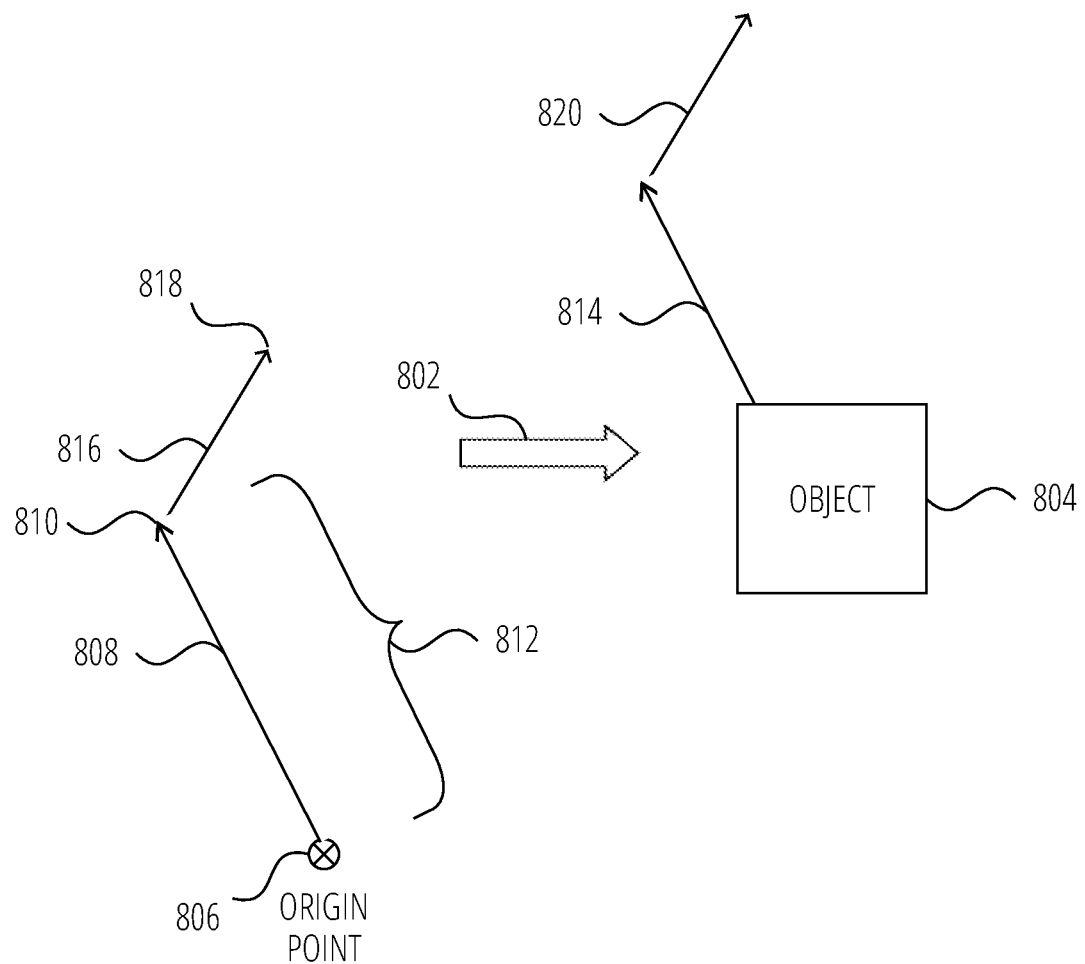
FIG. 8 illustrates is a vector diagram showing an example vector transformation, according to some examples.

FIG. 8 is a vector diagram showing an example vector transformation 802, according to some embodiments. In the depicted example, one or more sensors, such as sensors 202, 722, 724, observe a user's hand until a targeting gesture is observed. The targeting gesture, for example, can be a hand gesture such as one of the user's hands reaching towards an object 804. The targeting gesture can also include a voice command, such as "target the red book," and/or a body gesture, such as a foot tap, a double wink of the eyelid, and so on, while pointing to the targeted object 804. The object

804, when targeted, can then be illuminated, displayed inside brackets, and so on. A voice notification can also be provided, announcing that the object 804 has been targeted.

Once the object 804 is targeted, a manipulation gesture is then detected. The manipulation gesture, such as the pinch gesture 208, is used to determine an origin point 806 and to initiate a virtual joystick mode. It is also to be noted that the manipulation gesture can be a body gesture (e.g., foot tap, double wink of the eyelid) and/or voice command, such as "initiate manipulation." When using the pinch gesture 208, the origin point 806 is a point in 3D space where the user's thumb and index finger meet. When using voice commands and/or body gestures, instead of the pinch gesture 208, the origin point 806 can be set to be the tip of a finger, the middle of the user's palm, and so on.

The user is then notified that the origin point 806 has been detected, for example, via a visual indication, such as a flashing point in 3D space being displayed (e.g., via the head-wearable apparatus 116) and/or by a voice notification. The user then moves their hand, for example, in a direction 808 and then stops hand movement at a 3D point 810. Other stop gestures can also be used, such as voice commands (e.g., "stop") and/or body gestures (e.g., foot tap, double wink of the eyelid). The 3D point 810 then becomes the end point for a vector having direction 808 and length 812.

In some embodiments, the vector defined by origin point 806 and end point 810 is then translated into an action, such as a "move" action. The move action will move the object 804 by using a vector 814. The vector 814 has the direction 814 and a magnitude (e.g., velocity) that is representative of either the length 812 or a hand velocity when moving the hand from the origin point 806 to the end point 810. In one example, the move action will continue indefinitely until a stop move gesture is given. The stop move gesture can be a hand gesture, a body gesture, and/or a voice command. For example, when using the pinch gesture 208 as the manipulation gesture, unpinching the fingers can be used to stop movement for the object 804. In some examples, the unpinching gesture can also be used to exit the virtual joystick mode.

While in the joystick mode, any number of new vectors may be derived by observing the user's hands. In the depicted example, after stopping at point 810 (e.g., stopping hand movement for a certain time, such as 1 second, 2 seconds, and so on), the user can continue hand movement in a direction 816 and stop at a point 818. Accordingly, a new vector 820 is derived and applied to the object 804. For example, the object 804 may now be moved in the direction 816 at a velocity representative of the distance between points 818 and 810 or the user's hand velocity between the points 818 and 810. The joystick mode can end with certain user gestures, such as hand gestures, body gestures, and voice commands. It is to be noted that the user can be made aware of entering joystick mode as well as when leaving joystick mode, for example, by certain visualizations (e.g., text, blinking light) and/or voice prompts.

Figure 9:
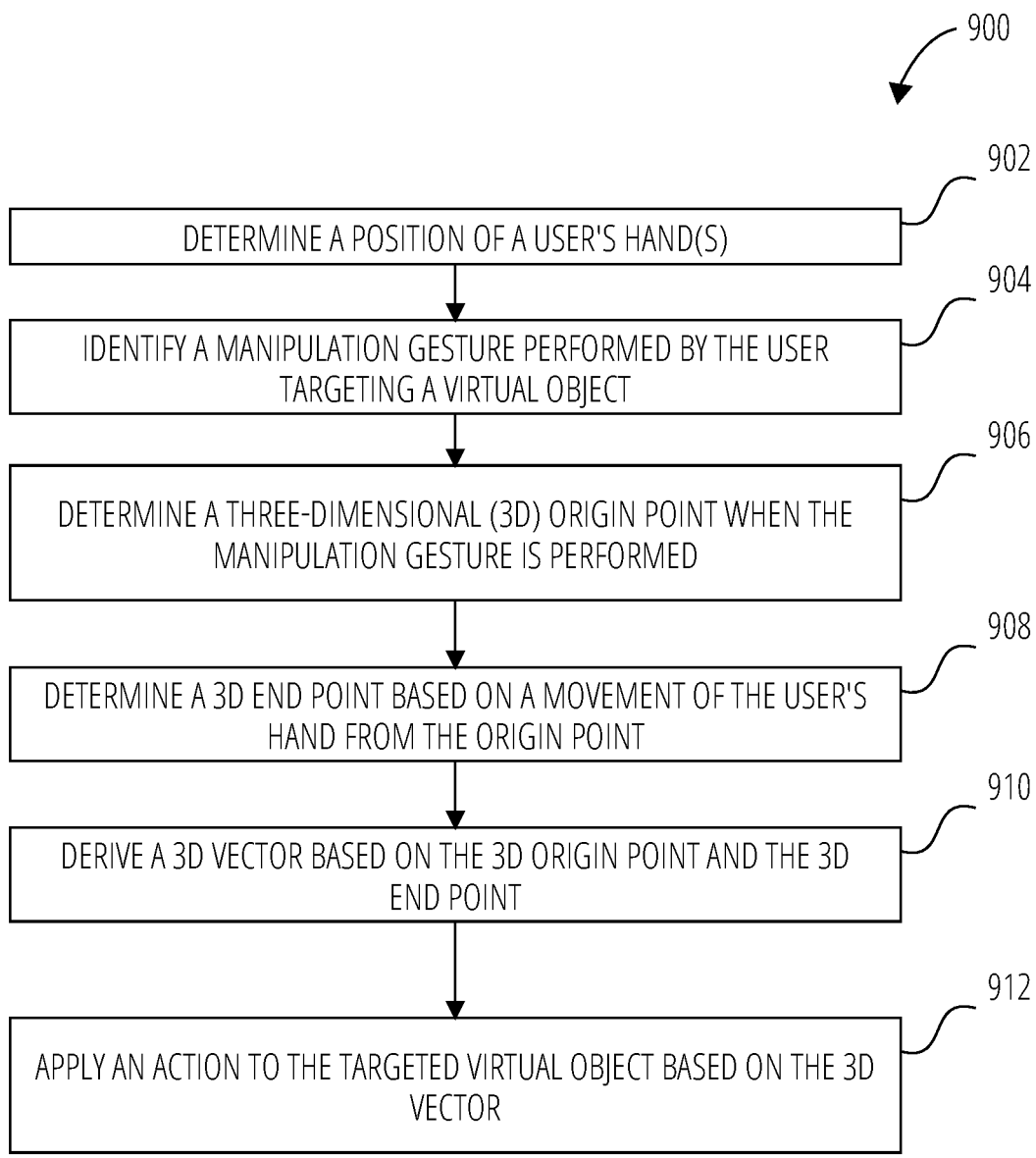
FIG. 9 illustrates a process suitable for manipulating a virtual object, in according to some examples.

FIG. 9 is a flowchart of an example process 900 suitable for detecting and using certain hand movements, according to some embodiments. More specifically, the process 900 allows users to manipulate virtual objects beyond the user's arm reach in an augmented reality (AR) or virtual reality (VR) environment through hand gestures. The process 900 determines, at block 902, a position of the user's hand(s). For example, the sensors 202, 722, 724 are used to observe one or both of the user's hands. The process 900 then identifies, at block 904, a manipulation gesture targeting a virtual object. For example, the user can first target the virtual object via a targeting gesture, for example, can be a hand gesture such as one of the user's hands reaching towards the virtual object. Other targeting hand gestures include pointing to the virtual object, attempting to grab the virtual object at a distance, and so on. The targeting gesture can also include a voice command, such as "target the red book," and/or a body gesture, such as a foot tap, a double wink of the eyelid, and so on.

The now targeted virtual object can then be manipulated via the identified manipulation gesture. For example, the pinch gesture 208 can be used as a manipulation gesture to manipulate the virtual object. The process 900 then, at block 906, determines a three-dimensional (3D) origin point based on the position of the user's hand when the manipulation gesture is performed. For example, when using the pinch gesture 208, the origin point 806 is a point in 3 dimensions where the thumb and index finger meet. When using voice commands and/or body gestures, the origin point can be set to be the tip of a finger or the middle of the user's palm.

The user can then move the targeted hand and the process 900, at block 908, determines a 3D end point based on a movement of the user's hand from the origin point. For example, the user moves their hand in a desired direction and then stops hand movement at a 3D point. Other stop gestures can also be used, such as voice commands (e.g., "stop") and/or body gestures (e.g., foot tap, double wink of the eyelid). The 3D point where the pinched thumb stops movement is then determined to be the end point. In some examples, the center of the palm of the hand, a fingertip, and so on, can be used as an alternative to the pinched thumb.

The process 900 then derives, at block 910, a 3D vector based on the 3D origin point and the 3D end point. For example, the vector has a direction from the origin point to the end point and a magnitude (e.g., velocity) based on the distance from the origin point to the end point. In some examples, the magnitude is based on the speed of the hand movement from the origin point to the end point as opposed to the calculated length. At block 912, process 900 then applies an action to the targeted virtual object based on the derived 3D vector. For example, the targeted object can be moved in the direction pointed to by the derived vector at a velocity representative of the derived vector's magnitude. By providing for the use of targeting and/or manipulation gestures, the techniques described herein enable manipulation of VR and/or AR objects that are outside of the user's reach.

Machine Architecture

Figure 10:
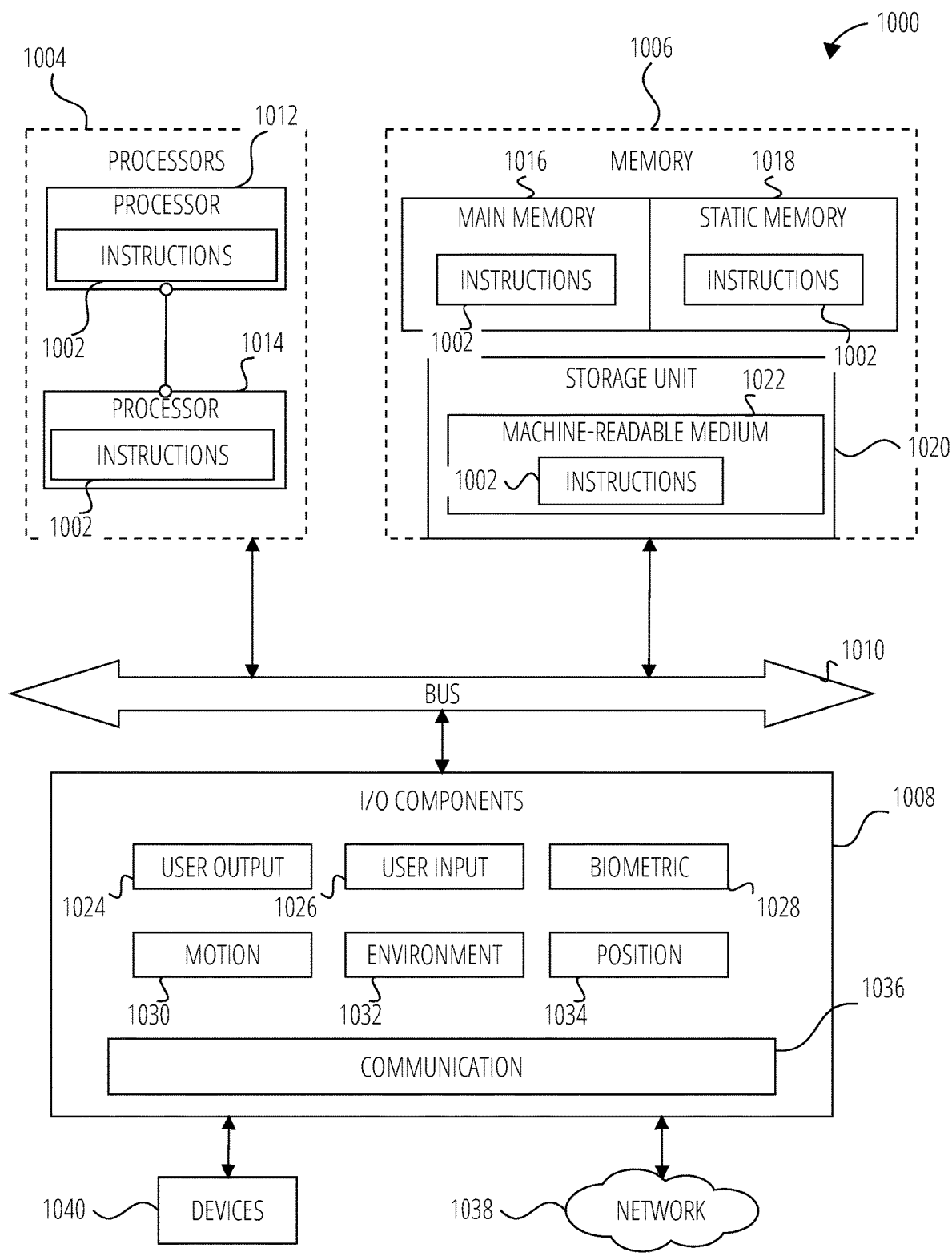
FIG. 10 is a diagrammatic representation of a machine in the form of a computer system within which a set of instructions may be executed to cause the machine to perform any one or more of the methodologies discussed herein, according to some examples.

FIG. 10 is a diagrammatic representation of the machine 1000 within which instructions 1002 (e.g., software, a program, an application, an applet, an app, or other executable code) for causing the machine 1000 to perform any one or more of the methodologies discussed herein may be executed. For example, the instructions 1002 may cause the machine 1000 to execute any one or more of the methods described herein. The instructions 1002 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1002, sequentially or otherwise, that specify actions to be taken by the machine 1000. Further, while a single machine 1000 is illustrated, the term "machine" shall also be taken to include a collection of machines that individually or jointly execute the instructions 1002 to perform any one or more of the methodologies discussed herein. The machine 1000, for example, may comprise the user system 102 or any one of multiple server devices forming part of the interaction server system 110. In some examples, the machine 1000 may also comprise both client and server systems, with certain operations of a particular method or algorithm being performed on the server-side and with certain operations of the particular method or algorithm being performed on the client-side.

The machine 1000 may include processors 1004, memory 1006, and input/output I/O components 1008, which may be configured to communicate with each other via a bus 1010. In an example, the processors 1004 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1012 and a processor 1014 that execute the instructions 1002. The term "processor" is intended to include multi-core processors that may comprise two or more independent processors (sometimes referred to as "cores") that may execute instructions contemporaneously. Although FIG. 10 shows multiple processors 1004, the machine 1000 may include a single processor with a single-core, a single processor with multiple cores (e.g., a multi-core processor), multiple processors with a single core, multiple processors with multiples cores, or any combination thereof.

The memory 1006 includes a main memory 1016, a static memory 1018, and a storage unit 1020, both accessible to the processors 1004 via the bus 1010. The main memory 1006, the static memory 1018, and storage unit 1020 store the instructions 1002 embodying any one or more of the methodologies or functions described herein. The instructions 1002 may also reside, completely or partially, within the main memory 1016, within the static memory 1018, within machine-readable medium 1022 within the storage unit 1020, within at least one of the processors 1004 (e.g., within the processor's cache memory), or any suitable combination thereof, during execution thereof by the machine 1000.

The I/O components 1008 may include a wide variety of components to receive input, provide output, produce output, transmit information, exchange information, capture measurements, and so on. The specific I/O components 1008 that are included in a particular machine will depend on the type of machine. For example, portable machines such as mobile phones may include a touch input device or other such input mechanisms, while a headless server machine will likely not include such a touch input device. It will be appreciated that the I/O components 1008 may include many other components that are not shown in FIG. 10. In various examples, the I/O components 1008 may include user output components 1024 and user input components 1026. The user output components 1024 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1026 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1008 may include biometric components 1028, motion components 1030, environmental components 1032, or position components 1034, among a wide array of other components. For example, the biometric components 1028 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The biometric components may include a brain-machine interface (BMI) system that allows communication between the brain and an external device or machine. This may be achieved by recording brain activity data, translating this data into a format that can be understood by a computer, and then using the resulting signals to control the device or machine.

Example types of BMI technologies, including:
Electroencephalography (EEG) based BMIs, which record electrical activity in the brain using electrodes placed on the scalp.
Invasive BMIs, which used electrodes that are surgically implanted into the brain.
Optogenetics BMIs, which use light to control the activity of specific nerve cells in the brain.

Any biometric data collected by the biometric components is captured and stored only with user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the data is not shared or sold to any third party without the explicit consent of the user. In addition, appropriate technical and organizational measures are implemented to ensure the security and confidentiality of this sensitive information.

The motion components 1030 include acceleration sensor components (e.g., accelerometer), gravitation sensor components, rotation sensor components (e.g., gyroscope).

The environmental components 1032 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 1034 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1008 further include communication components 1036 operable to couple the machine 1000 to a network 1038 or devices 1040 via respective coupling or connections. For example, the communication components 1036 may include a network interface component or another suitable device to interface with the network 1038. In further examples, the communication components 1036 may include wired communication components, wireless communication components, cellular communication components, Near Field Communication (NFC) components, Bluetooth© components (e.g., Bluetooth© Low Energy), Wi-Fi© components, and other communication components to provide communication via other modalities. The devices 1040 may be another machine or any of a wide variety of peripheral devices (e.g., a peripheral device coupled via a USB).

Moreover, the communication components 1036 may detect identifiers or include components operable to detect identifiers. For example, the communication components 1036 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 1036, such as location via Internet Protocol (IP) geolocation, location via Wi-Fi® signal triangulation, location via detecting an NFC beacon signal that may indicate a particular location, and so forth.

The various memories (e.g., main memory 1016, static memory 1018, and memory of the processors 1004) and storage unit 1020 may store one or more sets of instructions and data structures (e.g., software) embodying or used by any one or more of the methodologies or functions described herein. These instructions (e.g., the instructions 1002), when executed by processors 1004, cause various operations to implement the disclosed examples.

The instructions 1002 may be transmitted or received over the network 1038, using a transmission medium, via a network interface device (e.g., a network interface component included in the communication components 1036) and using any one of several well-known transfer protocols (e.g., hypertext transfer protocol (HTTP)). Similarly, the instructions 1002 may be transmitted or received using a transmission medium via a coupling (e.g., a peer-to-peer coupling) to the devices 1040.

Software Architecture

Figure 11:
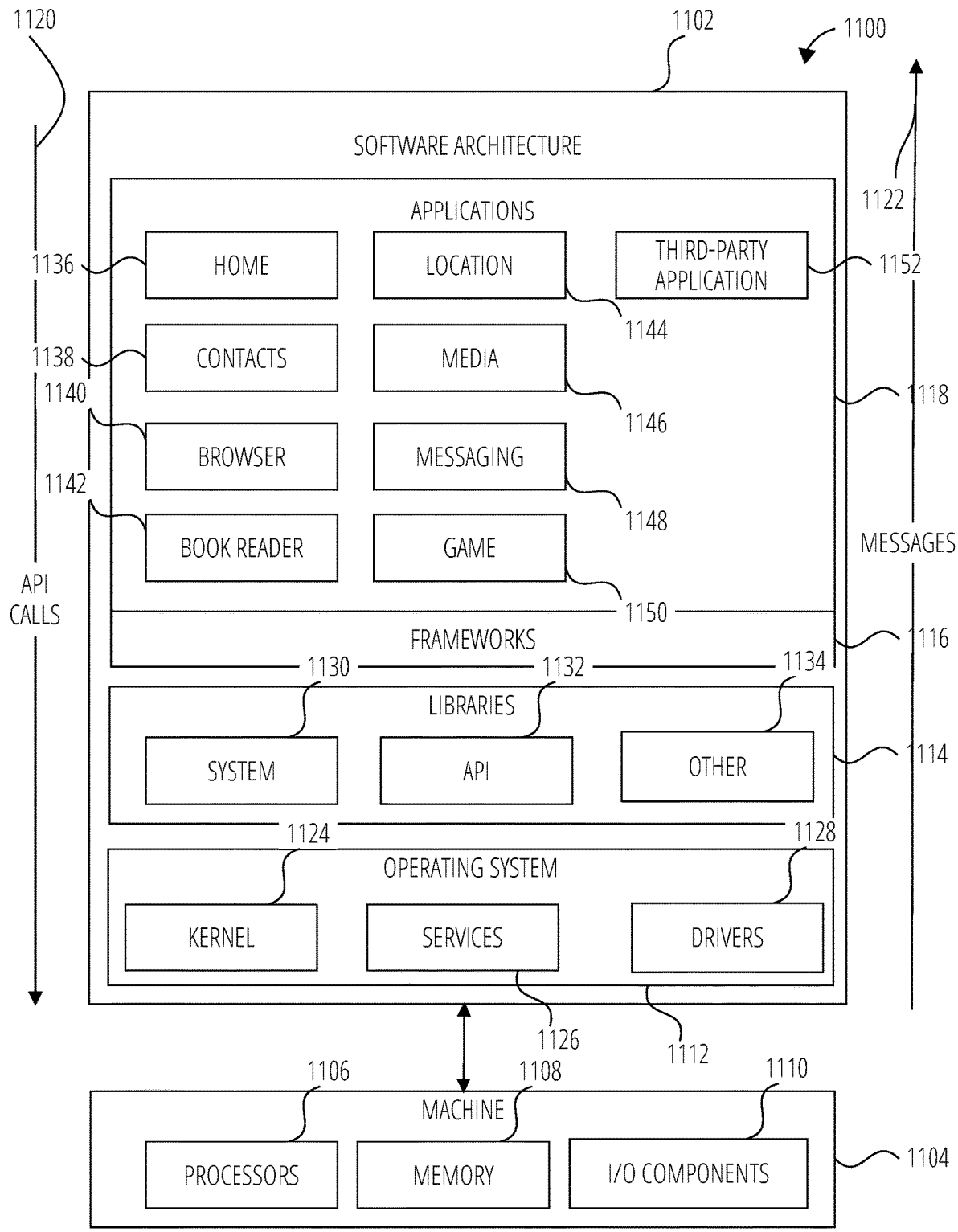
FIG. 11 is a block diagram showing a software architecture within which examples may be implemented.

FIG. 11 is a block diagram 1100 illustrating a software architecture 1102, which can be installed on any one or more of the devices described herein. The software architecture 1102 is supported by hardware such as a machine 1104 that includes processors 1106, memory 1108, and I/O components 1110. In this example, the software architecture 1102 can be conceptualized as a stack of layers, where each layer provides a particular functionality. The software architecture 1102 includes layers such as an operating system 1112, libraries 1114, frameworks 1116, and applications 1118. Operationally, the applications 1118 invoke API calls 1120 through the software stack and receive messages 1122 in response to the API calls 1120.

The operating system 1112 manages hardware resources and provides common services. The operating system 1112 includes, for example, a kernel 1124, services 1126, and drivers 1128. The kernel 1124 acts as an abstraction layer between the hardware and the other software layers. For example, the kernel 1124 provides memory management, processor management (e.g., scheduling), component management, networking, and security settings, among other functionalities. The services 1126 can provide other common services for the other software layers. The drivers 1128 are responsible for controlling or interfacing with the underlying hardware. For instance, the drivers 1128 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1114 provide a common low-level infrastructure used by the applications 1118. The libraries 1114 can include system libraries 1130 (e.g., C standard library) that provide functions such as memory allocation functions, string manipulation functions, mathematic functions, and the like. In addition, the libraries 1114 can include API libraries 1132 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1114 can also include a wide variety of other libraries 1134 to provide many other APIs to the applications 1118.

The frameworks 1116 provide a common high-level infrastructure that is used by the applications 1118. For example, the frameworks 1116 provide various graphical user interface (GUI) functions, high-level resource management, and high-level location services. The frameworks 1116 can provide a broad spectrum of other APIs that can be used by the applications 1118, some of which may be specific to a particular operating system or platform.

In an example, the applications 1118 may include a home application 1136, a contacts application 1138, a browser application 1140, a book reader application 1142, a location application 1144, a media application 1146, a messaging application 1148, a game application 1150, and a broad assortment of other applications such as a third-party application 1152. The applications 1118 are programs that execute functions defined in the programs. Various programming languages can be employed to create one or more of the applications 1118, structured in a variety of manners, such as object-oriented programming languages (e.g., Objective-C, Java, or C++) or procedural programming languages (e.g., C or assembly language). In a specific example, the third-party application 1152 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1152 can invoke the API calls 1120 provided by the operating system 1112 to facilitate functionalities described herein.

Glossary

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers, for example, to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action or interaction on the user device, including an interaction with other users or computer systems.

What is claimed is:

1. A system, comprising:
   one or more hardware processors; and
   at least one memory storing instructions that cause the one or more hardware processors to perform operations comprising:
   determining a position of a user's hand using one or more sensors;
   identifying a manipulation gesture performed by the user's hand targeting a virtual object;
   determining a three-dimensional (3D) origin point based on the position of the user's hand when the manipulation gesture is performed;
   determining a 3D end point based on a movement of the user's hand from the 3D origin point;
   deriving a 3D vector based on the 3D origin point and the 3D end point;
   applying a velocity to the targeted virtual object based on the 3D vector; and continuing movement of the targeted virtual object at the velocity until a disengage gesture is detected.

2. The system of claim 1, wherein the velocity applied to the targeted virtual object has a direction corresponding to the 3D vector and a magnitude both derived via observation of the hand movement from the 3D origin point to the 3D end point.

3. The system of claim 2, wherein the magnitude is based on a length of the 3D vector or on a hand velocity of the user's hand from the 3D origin point to the 3D end point.

4. The system of claim 2, wherein applying the velocity comprises moving the targeted virtual object in an augmented reality (AR) or a virtual reality (VR) environment in the direction and at the velocity.

5. The system of claim 4, wherein the disengage gesture comprises a stop gesture performed by the user.

6. The system of claim 1, wherein the manipulation gesture comprises a hand gesture, a body gesture, a voice command, or a combination thereof.

7. The system of claim 6, wherein the hand gesture comprises a pinch gesture, and wherein determining the 3D end point comprises determining a point in space where the user stops moving the user's hand while maintaining the pinch gesture, and wherein the disengage gesture comprises releasing the pinch gesture.

8. The system of claim 7, wherein identifying the manipulation gesture comprises using an artificial intelligence model to determine that the manipulation gesture is the pinch gesture.

9. The system of claim 8, wherein the artificial intelligence model comprises a deep learning model configured to detect hand landmarks directly from a camera image.

10. The system of claim 1, comprising operations for:
determining a second 3D origin point based on a stop position of the user's hand when the user stops moving the hand;
determining a second 3D end point based on a second movement of the user's hand from the second 3D origin point;
deriving a second 3D vector based on the second 3D origin point and the second 3D end point; and
applying a second velocity to the targeted virtual object based on the second 3D vector.

11. The system of claim 10, wherein applying the second velocity comprises moving the targeted virtual object based on the second 3D vector, wherein the second velocity has a direction corresponding to a vector direction of the second 3D vector and a magnitude based on a length of the second 3D vector.

12. The system of claim 1, wherein the one or more sensors includes: camera sensors, radar sensors, light detection and ranging (lidar) sensors, or a combination thereof, included in an AR device, a VR device, or a combination thereof, worn by the user.

13. The system of claim 12, wherein the one or more sensors includes: camera sensors, radar sensors, lidar sensors, or a combination thereof, disposed external to the AR device and to the VR device.

14. The system of claim 1, wherein applying the velocity to the targeted virtual object comprises executing instructions for a joystick driver.

15. The system of claim 14, wherein the instructions for the joystick driver emulate a physical joystick.

16. The system of claim 1, comprising deriving that the user is targeting the virtual object based on identifying a targeting gesture performed by the user targeting the virtual object.

17. The system of claim 16, wherein the targeting gesture comprises a hand gesture, a body gesture, a voice command, or a combination thereof.

18. The system of claim 17, wherein the hand gesture comprises an extended palm pointing towards the targeted virtual object.

19. A method comprising:
determining a position of a user's hand;
identifying a manipulation gesture performed by the user targeting a virtual object;
determining a position of a user's hand using one or more sensors;
identifying a manipulation gesture performed by the user targeting a virtual object;
determining a three-dimensional (3D) origin point based on the position of the user's hand when the manipulation gesture is performed;
determining a 3D end point based on a movement of the user's hand from the origin point;
deriving a 3D vector based on the 3D origin point and the 3D end point;
applying a velocity to the targeted virtual object based on the 3D vector; and
continuing movement of the targeted virtual object at the velocity, the targeted virtual object continuing at the velocity until a disengage gesture is detected.

20. A non-transitory computer-readable storage medium storing instructions that, when executed by at least one processor, cause the at least one processor to perform operations comprising:
determining a position of a user's hand using one or more sensors;
identifying a manipulation gesture performed by the user targeting a virtual object;
determining a three-dimensional (3D) origin point based on the position of the user's hand when the manipulation gesture is performed;
determining a 3D end point based on a movement of the user's hand from the origin point;
deriving a 3D vector based on the 3D origin point and the 3D end point;
applying a velocity to the targeted virtual object based on the 3D vector; and
continuing movement of the targeted virtual object at the velocity, the targeted virtual object continuing at the velocity until a disengage gesture is detected.

* * * * *